US006182125B1

(12) United States Patent
Borella et al.

(10) Patent No.: US 6,182,125 B1
(45) Date of Patent: Jan. 30, 2001

(54) METHODS FOR DETERMINING SENDABLE INFORMATION CONTENT BASED ON A DETERMINED NETWORK LATENCY

(75) Inventors: Michael S. Borella, Naperville; Guido M. Schuster, Des Plaines; Ikhlaq S. Sidhu, Vernon Hills; Jacek A. Grabiec, Chicago, all of IL (US)

(73) Assignee: 3Com Corporation, Santa Clara, CA (US)

(*) Notice: Under 35 U.S.C. 154(b), the term of this patent shall be extended for 0 days.

(21) Appl. No.: 09/170,437

(22) Filed: Oct. 13, 1998

(51) Int. Cl.[7] .................................................. G06F 15/16
(52) U.S. Cl. .................. 709/218; 709/219; 709/224; 709/225; 709/226; 370/234
(58) Field of Search ........................ 709/218–219, 709/200, 233, 202, 220, 223–226; 704/233; 707/501; 370/294, 431; 712/35

(56) References Cited

U.S. PATENT DOCUMENTS

| | | | |
|---|---|---|---|
| 4,058,113 | | 11/1977 | Fields ................................... 128/558 |
| 4,843,568 | | 6/1989 | Krueger et al. ....................... 364/100 |
| 5,838,685 | * | 11/1998 | Hochman ............................. 370/428 |
| 5,860,936 | | 1/1999 | Levin .................................... 600/558 |
| 5,933,413 | * | 8/1999 | Merchant et al. .................... 370/234 |
| 5,983,176 | * | 11/1999 | Hoffert et al. ....................... 704/233 |
| 6,012,096 | * | 1/2000 | Link et al. ........................... 709/233 |
| 6,018,748 | * | 1/2000 | Smith .................................... 707/501 |
| 6,021,426 | * | 2/2000 | Douglis et al. ...................... 709/200 |
| 6,038,598 | * | 3/2000 | Danneels ............................. 709/219 |

* cited by examiner

Primary Examiner—Ahmad F. Matar
Assistant Examiner—Thu Ha T. Nguyen
(74) Attorney, Agent, or Firm—McDonnell Boehnen Hulbert & Berghoff; Stephen Lesavich

(57) ABSTRACT

A method for improving perception of electronic content from a computer network such as the Internet or an intranet. Network latencies and the type of electronic content such as text, graphical images, animation, voice, video and other electronic content interact to influence user perception of the quality of information provided. As network latency increases and becomes more variable, users typically become less satisfied. The method dynamically adjusts the amount of electronic content presented to user based on a determined network latency. The amount of electronic content is also adjusted progressively and underlying transport protocol such as Transmission Control Protocol ("TCP") and User Datagram Protocol ("UDP") are adaptively adjusted based on the type of electronic content requested (e.g., TCP for text, UDP for graphical images, etc.). The method may improve user perception of requested original electronic content by dynamically sending an amount of original electronic content based on a determined network latency. Improved user perception of original electronic content may help attract and retain, students, customers, contributors, etc. to an organization's electronic content site on a computer network (e.g., a home page on the Internet or an intranet).

24 Claims, 3 Drawing Sheets

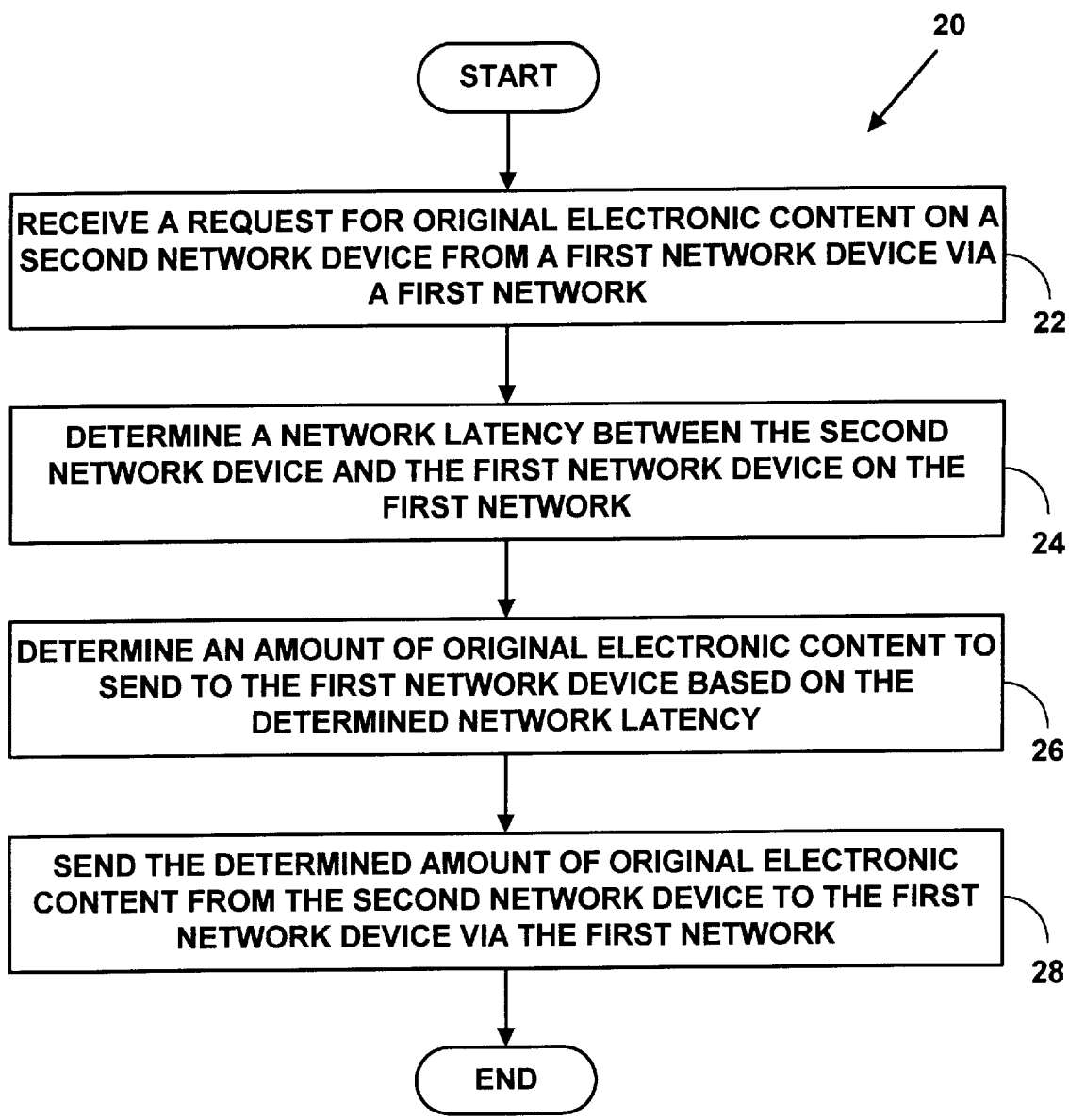

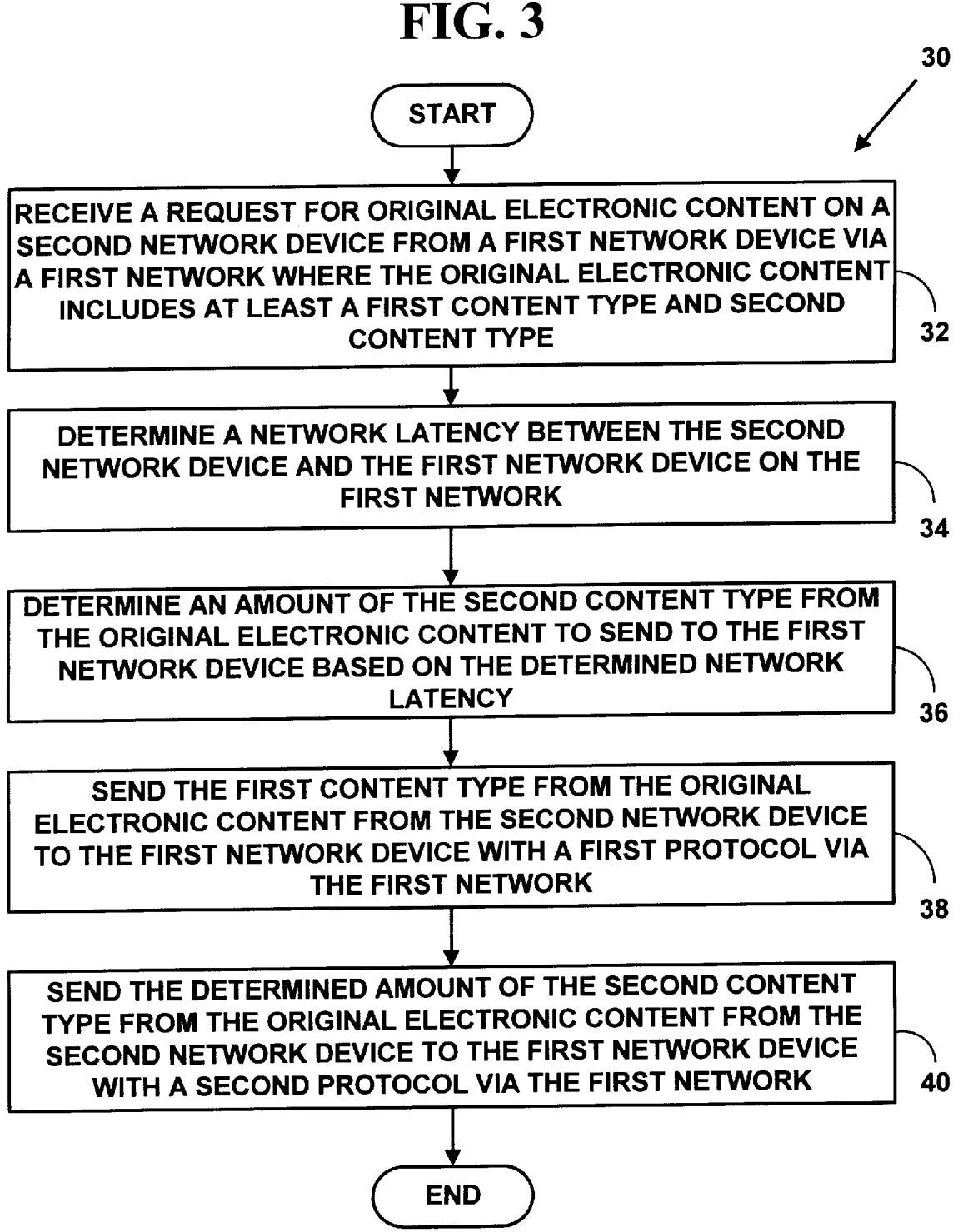

METHODS FOR DETERMINING SENDABLE INFORMATION CONTENT BASED ON A DETERMINED NETWORK LATENCY

FIELD OF INVENTION

This invention relates to computer networks. More specifically, it relates methods for improving perception of electronic information content over computer networks such as the Internet or an intranet.

BACKGROUND OF THE INVENTION

Electronic content is obtained from a variety of computer networks including the Internet, intranets, and other computer networks. The Internet is a world-wide network of interconnected computers. The World-Wide-Web is an information system on the Internet designed for electronic content interchange. Electronic content on the World-Wide-Web is typically stored in files that include text, hypertext, references to graphics, animation, audio, video and other electronic data.

Network transfer latencies and electronic content types influence user perception of the quality of information provided by a computer network. Since response to the delivery of electronic content from computer networks like the Internet or an intranet is variable, user perception of the quality of information also varies. In one study, user perception of the quality of electronic content including text and graphics decreased as network response time increased. However, if the same electronic content is provided including only text and no graphics, user perception of the quality of the electronic content increased with respect to network response time. For more information see "The Effects of Internet Latency on User Perception of Information Content", by M. S. Borella, A. Sears and J. A. Jacko, IEEE Global Internet '97, pp. 1932–1936, November, 1997.

It appears than when network latencies are large, users typically blame graphical information in the electronic content for delays in obtaining desired information. If requested electronic content has only text, users typically acknowledge that the content provider has done all that could be done to provide the electronic content in a timely manner. However, when network latencies are small, users typically expect the electronic content with text and graphics to contain a greater quality of information.

User perception of electronic content is important to many organizations, especially to those that use computer networks to provide information. For example, user perception of information may be important to a university to attract students, to a business to attract customers, to a charity to attract donations, etc. In many situations, the first and only impression that a potential client or customer receives is based on electronic content retrieved from an organization's computer network or site on the Internet.

The are several problems associated with providing electronic content to a wide range of users from a computer network. A user may connect to a computer network with a relatively slow dial-up connection via a modem (e.g., 56,000 bits-per-second), or over a higher-speed network connection (e.g., a 1.5 Mega-bit-per-second) in a university or corporation. The type of electronic content provided may be adjusted based on a connection speed. However, it is difficult to adjust the type of electronic content based on network latency. Network latency conditions change dynamically, and even a fast connection may have a large network latency at a given time. In addition, a provider of electronic content cannot predict with reasonable certainty what a network latency will be at a given time.

Providing static electronic content for all users with varying network latencies may lead to user dissatisfaction and poor user perception of the electronic content. Thus, it is desirable to provide electronic content from computer network in a manner to ensure improved user perception regardless of network latency.

SUMMARY OF THEE INVENTION

In accordance with preferred embodiments of the present invention, some of the problems associated with user perception of electronic content provided by computer networks are overcome. Methods for the dynamic provision of electronic content are provided. One aspect of present invention includes a method for dynamically providing electronic content over a computer network. A request for original electronic content is received on a second network device from a first network device via a first network. A network latency on the first network is determined between the second network device and the first network device. An amount of original electronic content to send to the first network device is determined dynamically based on the determined network latency. The determined amount of original electronic content type is sent from the second network device to the first network device in response to the request for original electronic content. For example, the method allows the number of graphical images in original electronic content to be sent to be dynamically adjusted based on a determined network latency.

Another aspect of the present invention includes a method for providing electronic content over a computer network with adaptive transport. A request for original electronic content is received on a second network device from a first network device via a first network. The original electronic content includes at least a first content type and a second content type. A network latency on the first network is determined between the second network device and the first network device. An amount of original electronic content of the second content type to send to the first network device is determined dynamically based on the determined network latency. The first content type of electronic content from the original electronic content is sent with a first protocol from the second network device to the first network device. The determined amount of the second content type of electronic content from the original electronic content is sent with a second protocol from the second network device to the first network device. For example, the method allows text to be sent with a first reliable connection-oriented protocol, and graphical images to be sent with a second faster connectionless less reliable protocol based on a determined network latency.

Aspects of the present invention may improve user perception of requested original electronic content by dynamically sending an amount of original electronic content based on a determined network latency and providing electronic content over a computer network with adaptive transport. Improved user perception of original electronic content may help attract and retain students, customers, contributors, etc. to an organization's electronic content site on a computer network (e.g., a home page on the Internet or an intranet).

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 2 is a flow diagram illustrating a method for dynamically providing electronic content; and FIG. 3 is a flow diagram illustrating a method for providing electronic content with adaptive transport.

DETAILED DESCRIPTION OF PREFERRED EMBODIMENTS

Exemplary Network System

Figure 1:
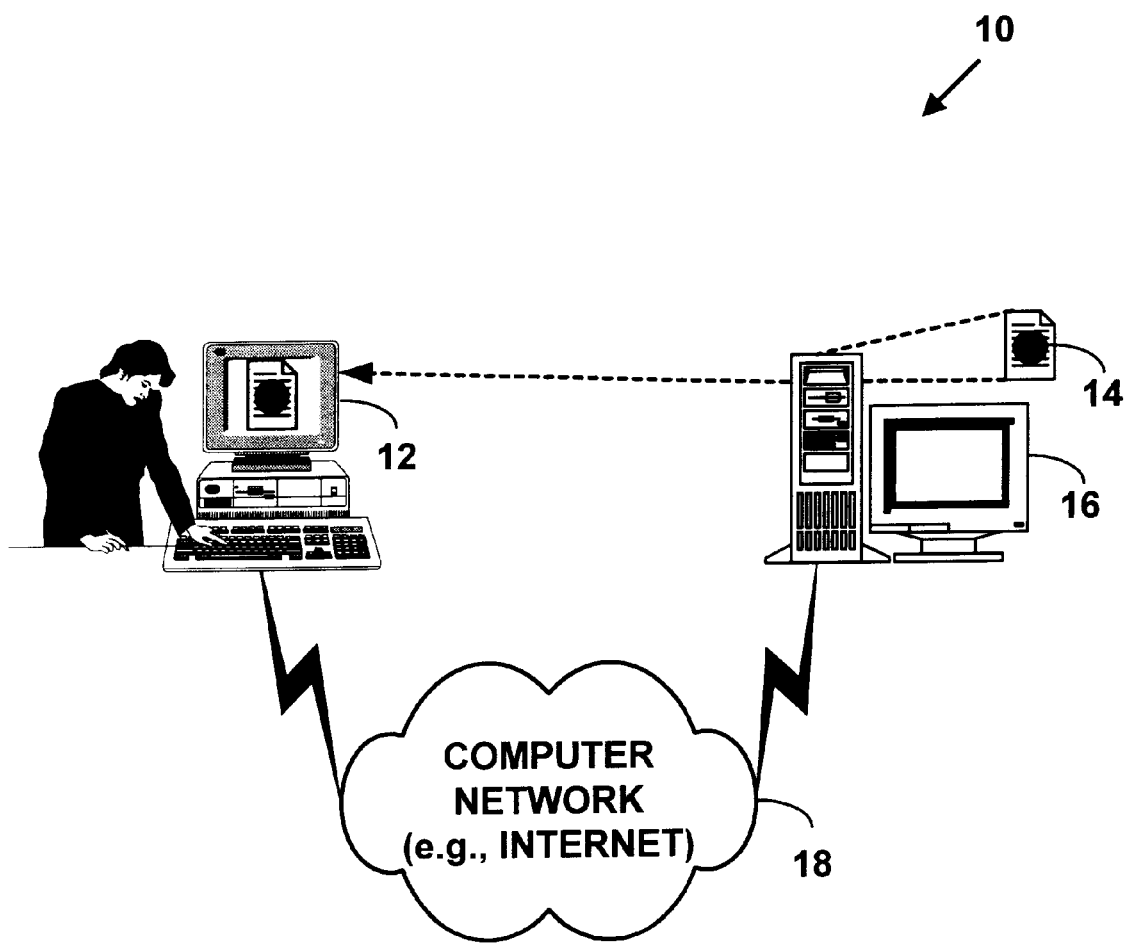
FIG. 1 is a block diagram illustrating an exemplary network system.

FIG. 1 is a block diagram illustrating an exemplary network system 10. The network system 10 includes a first network device 12 that requests original electronic content 14 from a second network device 16 on a first network 18. In one preferred embodiment of the present invention, the first network device 12 is a user computer with a network browser, the second network device 16 is an electronic content server (e.g., a web server). The first network 18 the Internet, an intranet or another computer network that can provide electronic content.

The original electronic content 14 includes text, hypertext, graphical data or references to graphical data images, audio, video and other content. The structure of the original electronic content 14 is typically defined by document markup languages such as Standard Generalized Markup Language ("SGML"), Hyper Text Markup Language ("HTML"), extensible Markup Language ("XML"), Virtual Reality Markup Language ("VRML") and others. Markup languages also allow references to additional content besides text including graphics, animation, audio, video and other electronic data and include markup tags.

However, the present invention is not limited to these network devices, networks, or original electronic content types shown in FIG. 1. Other network devices, networks and original electronic content types can also be used.

An operating environment for network devices of the present invention include a processing system with at least one high speed Central Processing Unit ("CPU") and a memory. In accordance with the practices of persons skilled in the art of computer programming, the present invention is described below with reference to acts and symbolic representations of operations that are performed by the processing system, unless indicated otherwise. Such acts and operations are referred to as being "computer-executed" or "CPU executed."

It will be appreciated that acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Providing Dynamic Electronic Content to Improve User Perception

FIG. 2 is a flow diagram illustrating a Method 20 for dynamically providing electronic content. At Step 22, a request is received for original electronic content 14 on a second network device 16 from a first network device 12 via a first network 18. At Step 24, a network latency is determined on the first network 18 between the second network device 16 and the first network device 12. At Step 26, an amount of original electronic content to send to the first network device 12 is determined dynamically based on the determined network latency. At Step 28, the determined amount of electronic content type is sent from the second network device 16 to the first network device 12 in response to the request for original electronic content 14.

Method 20 allows an amount of electronic content to be dynamically sent to a user that is using the first network device 12 based on a determined network latency. As was discussed above, on a network connection with a faster response time (i.e., smaller network latency), users typically expect requested original electronic content be of a higher quality and contain a larger variety of content. On a network connection with a slower response time (i.e., larger network latency), users typically will accept the requested original electronic content to be of a lower quality and contain a smaller variety of content.

Method 20 helps improve user perception of requested original electronic content by dynamically sending an amount of original electronic content based on a determined network latency. Improved user perception of original electronic content may help attract and retain, students, customers, contributors, etc. to an organization's information site on a computer network (e.g., a home page on the Internet or intranet).

In one exemplary preferred embodiment of the present invention, a request for a "web page" from the World-Wide-Web on the Internet or an intranet is received on a web server from network browser on a user computer at Step 22. However, the present invention is not limited to receiving a request on web server from a network browser on a user computer other requests and network devices can also be used.

The network browser is Internet Explorer by Microsoft Corporation of Redmond, Wash., Netscape Navigator, by Netscape Communications of Mountain View, Calif. and others. The web page includes original electronic content such as text, hypertext, graphical images, animation, audio, video and other electronic content.

In one exemplary embodiment of the present invention, the request is a Hyper Text Transfer Protocol ("HTTP") request. However, other requests may also be made (e.g., File Transfer Protocol ("FTP") request, etc.) and the present invention is not limited to HTTP requests. As is known in the art, HTTP is a transfer protocol used to transfer data from an electronic content server on the World-Wide-Web. For more information on HTTP see Internet Engineering Task Force ("IETF") Request For Comments ("RFC") 2068, incorporated herein by reference. File Transfer Protocol is a protocol that provides a way to access files on remote systems and is defined in RFC-172, incorporated herein by reference.

At Step 24, a network latency is determined between the web server and the user computer over the Internet or the intranet. The network latency determination may occur after receipt of an "HTTP GET" or "HTTP HEAD" message. The network latency determination may also occur during a transmission response to the user computer.

In one preferred embodiment of the present invention, the network latency is determined by transmitting a small number of Internet Control Message Protocol ("ICMP") "ping"

packets to the user computer. As is known in the art, ICMP is used for network management. The main functions of ICMP include error reporting, reachability testing (e.g., "pinging") congestion control, route-change notification, performance, subnet addressing and other maintenance. For more information on ICMP see RFC-792, incorporated herein by reference.

ICMP ping packets return with a timestamp that can be used to determine round-trip latency. Since the first ICMP ping packet may be delayed due to a Domain Name System lookup, the first ICMP packet is typically ignored in the network latency determination. ICMP does not attempt to recover from packet losses, so network latency estimates from a ping may be somewhat conservative compared to using Transmission Control Protocol ("TCP") packets. However, ICMP ping packets provide a reasonable first-order approximation of actual network delay and congestion for a network latency determination.

As is known in the art TCP provides a connection-oriented, end-to-end reliable protocol designed to fit into a layered hierarchy of protocols, which support multi-network applications. TCP provides for reliable inter-process communication between pairs of processes in network devices attached to distinct but interconnected networks. For more information on TCP see RFC-793, incorporated herein by reference.

In another preferred embodiment of the present invention, network latency is determined at Step 24 by sending a small portion of the requested original electronic content 14 to the user computer. The web server records a time at which it sends a small portion of the requested original electronic content 14 such as one complete HTML page. The network browser on the user computer requests other original electronic content such as graphical images after the network browser parses Uniform Resource Locators ("URLs") in the HTML page. The time between transmission of the one complete HTML page and reception of the request for the first original electronic content such as graphical images can be used as a round-trip network latency estimate. Using this method to determine network latency at Step 24 does not allow a network latency estimate to be determined for a first HTML page sent. Instead this method provides a network latency estimate that can be used to determine an amount of original electronic content at Step 26 to send to the user computer in the future.

In yet another preferred embodiment of the present invention, a network latency is determined at Step 24 with modifications to a socket Application Programming Interface ("API") and TCP implementation. As is known in the art, a socket is inter-process communication facility included in many operating systems. In such an embodiment, a TCP packet's round-trip time is recorded by a socket. As TCP packets are sent, the TCP packet's round-trip times are continuously recorded by a socket API and an estimate of the mean and variance of the round-trip delays are used to determine a network latency at Step 24.

Three exemplary methods to determine a network latency at Step 24 have been discussed. However, the present invention is not limited to these three methods, and other methods could also be used to determine network latency at Step 24.

In a preferred embodiment of the present invention, an amount of original content to send to the user computer is dynamically determined by the web server using the network latency determined at Step 24. In one embodiment of the present invention, web server (i.e., the second network device 16) determines an amount of original electronic content to send to the user computer (i.e., the first network device 12) using pre-determined cutoff latencies. The pre-determined cutoff latencies allow different amounts (e.g., different versions) of the original electronic content to be send to user computer. The pre-determined cutoff latencies are determined based on characteristics of type of computer network 18 being used (e.g., the Internet, an intranet, or another computer network).

As an example, assume that the network browser on the user computer requests original electronic content comprising text with five graphical images. After a network latency-L is determined at Step 24, the web server determines an amount of original electronic content to send to the first network device using cutoff latencies. Table 1 illustrates exemplary cutoff latencies for a determined network latency-L. However, the times for the cutoff latencies in Table 1 are exemplary only, and the present invention is not limited to the cutoff latencies illustrated in Table 1.

TABLE 1

| Cutoff Latencies for Determined Network Latency-L | Amount of Original Electronic Content Sent |
|---|---|
| L < 100 ms | Text and all 5 graphical images |
| 100 <= L < 200 ms | Text and 4 graphical images |
| 200 <= L < 300 ms | Text and 3 graphical images |
| 300 <= L < 400 ms | Text and 2 graphical images |
| 400 <= L < 500 ms | Text and 1 graphical images |
| L >= 500 ms | Text only |

Table 1 illustrates exemplary cutoff latencies for text and graphical images. The amount of original electronic content determined at Step 26 for other types of original electronic content such as animation, audio, video, etc. is determined in a similar manner with cutoff latencies at Step 26. However, an amount of original electronic content can also be determined using a method other than cutoff latencies.

Table 1 illustrates one exemplary original electronic content, network latency-L and one set of pre-determined cutoff latencies. However, virtually any original content, network latency-L and pre-determined cutoff latencies can be used with Method 20. Table 1 also illustrates only one encoding of five graphical images. However, many different encodings may also be used. High-resolution encodings are typically the most visually appealing but take the longest to transmit. Low-resolution encodings are typically the least visually appealing, but take less time to transmit. At Step 26, an image encoding resolution, an amount of video frames, etc., is determined based on the determined network latency and predetermined cutoff latencies.

At Step 28, the web server sends the determined amount of electronic content to the user computer. In one preferred embodiment of the present invention, graphical images are sent using the Joint Pictures Expert Group ("JPEG") standard. As is known in the art, JPEG is a standard with defined processes to encode or decode continuous still tone images. For more information, see "JPEG Still Image Data Compression Standard," by William B. Pennebaker, Thompson Publishing, December 1992, ISBN 0-442-012-721, incorporated herein by reference.

Graphical images are sent at Step 28 with a progressive JPEG image compression scheme. In one preferred embodiment of the present invention, the progressive JPEG image compression scheme includes three different progressive modes. However, the present invention is not limited to a JPEG progressive scheme or three progressive modes, and other compression and progressive schemes can also be used. In addition other electronic content can also be sent with other progressive and compression schemes. For example, video can be sent with Motion Pictures Expert Group ("MPEG") progressive and encoding schemes and the present invention is not limited to sending graphical images with a progressive scheme.

A first JPEG progressive mode is spatial resolution. The original image is stored as a pyramid of images. The top of the pyramid is a low-resolution version of the original image. The second layer is an image with twice the resolution of the top image. The next layer is an image twice the resolution of the second layer image, etc. The bottom layer of the pyramid is the same resolution size as the original image. Storing original images in this manner requires more storage space (e.g., approximately 33% more bits on the average), but allows a trade-off between available bit rate measured by network latency and spatial resolution. Thus, a low-resolution image appears first, and then an image of twice the resolution, etc. until an image with an original resolution arrives.

A second JPEG progressive mode is frequency resolution. The spatial frequencies of an image are transmitted in increasing order. For example, a Direct Component ("DC") is sent first, and the highest Altered Component ("AC") frequency is sent last. Thus, the image appears blurry at first and then gets clearer and clearer as time progresses.

A third JPEG progressive mode is signal-to-noise ratio. The bits of an image are transmitted in decreasing order. For example, the most significant bits of all frequencies are sent first and the least significant bits are sent last. Thus, the image starts out noisy and gets clearer and clearer as time progresses.

In image transmission schemes known in the art, each image opens its own TCP connection, and is progressively encoded independent of all other images. The images do not improve in a synchronous manner, but instead arrive and become clearer at different speeds. This often leads to user dissatisfaction and typically lowers user perception of quality of image data.

In one preferred embodiment of the present invention, all graphical images from requested electronic content are encoded in a single meta-image that is sent at Step 28. The single meta-image is transmitted progressively with one or more progressive and compression schemes. All the images in the single-meta images arrive and become clearer at the same time. This improve user satisfaction and may improve user perception of the quality of the image data.

In a preferred embodiment of the present invention, standard and hybrid progressive and compression schemes can be used at Step 28 to send a determined amount of electronic content. Progressive schemes may also be used with or without compression schemes.

Adaptive Transport of Electronic Content to Improve User Perception

FIG. 3 is a flow diagram illustrating a Method 30 for providing electronic content with adaptive transport. At Step 32, a request is received for original electronic content 14 on a second network device 16 from a first network device 12 via a first network 18. The original electronic content 14 includes at least a first content type and a second content type. At Step 34, a network latency is determined on the first network 18 between the second network device 16 and the first network device 12. At Step 36, amount of original electronic content 14 of the second content type to send to the first network device 12 is determined dynamically based on the determined network latency on the first network 18. At Step 38, the first content type of electronic content from the original electronic content is sent with a first protocol from the second network device 16 to the first network device 12. At Step 40, the determined amount of the second content type of electronic content from the original electronic content is sent with a second protocol from the second network device 16 to the first network device 12. The determined amount of the second type of electronic content may also be sent progressively and/or with a compression scheme as was described above for Method 20.

In one preferred embodiment of the present invention, the first network device 12 is a user computer with network browser, the second network device 14 is a web server and the first network is the Internet or an intranet. The first content type is text and the second content type is any of graphical images, animation, audio or video. The first protocol is TCP and the second protocol is User Datagram Protocol. However, the present invention is not limited to these network devices, networks, content types or protocols and other network devices, network, content types or protocols can also be used.

As an example, at Step 32, a request (e.g., an HTTP request) for original electronic content is received on the second network device 16 (e.g., a web server). The requested original electronic content includes text and at least one other electronic content type such as graphical images, animation, audio, video, etc. At Step 34, a network latency is determined as was described above for Method 20. At Step 36, amount of original electronic content 14 of the second content type to send to the first network device 12 is determined dynamically based on the determined network latency on the first network 18 between the first network device 12 and the second network device 16 as was described above for Method 20.

As is known in the art, HTTP typically uses TCP as its transport protocol. While TCP is reliable, it can result in large delays. In real-time services such as voice, the delays are too large and User Datagram Protocol ("UDP") may be used instead of TCP. As is known in the art, UDP provides a connectionless mode of communications with datagrams in an interconnected set of computer networks. UDP provides a transaction oriented datagram protocol, where delivery and duplicate packet protection are not guaranteed. For more information on UDP see RFC-768, incorporated herein by reference.

Most requests for original electronic content are made with TCP. For example, most "web searches" are real-time requests that require a fast and reliable response. However, once the original electronic content is located, a electronic content type such as graphical images or video can be sent to a network device with UDP instead of TCP.

In one preferred embodiment of the present invention, the first type of electronic content (e.g., text) is sent to the first network device 12 with a first protocol TCP at Step 36. TCP is used to send the fist type of electronic content since data packets containing the first type of electronic content cannot be lost. Otherwise a user may not be able to determine what the requested original electronic content actually is. For example, if text is lost, a user may not be able to determine what a graphical image or video clip actually represents.

However, at Step 38, the determined amount of the second type of electronic content (e.g., graphical images) is sent to the first network device 12 with a second protocol, UDP. All of the data packets representing the second type of electronic content do not have to arrive to allow a user to have a favorable perception of the second type of content. For example, if 90% of UDP data packets for a graphical image successfully arrive on the first network device 12, a user will typically still be able to view the graphical image and will typically have a favorable perception of the graphical data. In some scenarios, a user may not even be able to perceive a difference between electronic content for which UI)P packets have been lost and the original electronic content.

In one preferred embodiment of the present invention, an entity (e.g., image, video frame, etc.) for the second content type is encoded separately in UDP data packets such that a UDP data packet is independent of any other UDP data packet. This improves the speed of delivery of the second content type.

If an individual UDP data packet gets lost or is not delivered, the entity for the second content type is still viewable by a user and will typically provide a favorable perception of the second content type to a user. Losing a large number of UDP packets may causing gaps or blurring of the second content type and lead to a lower user perception of the original electronic content in certain situations. The gaps or blurring may be corrected by requesting the original electronic data again (e.g., with a "refresh" command on a network browser). However, use of Method 30 with UDP as a second protocol to send the second type of electronic content has been shown experimentally to still provide improved user perception of the quality of the second type of electronic content even if occasional gaps or blurring occurs.

In one exemplary embodiment of the present invention, Method 30 is used to transmit electronic content with a large amount of HTML markup text. The HTML markup text is transmitted with TCP and display text is transmitted with UDP. UDP is also used to transmit graphical images, video, and other electronic content besides text. In such a scenario, the HTML markup text is annotated with placeholders for the display text and transmitted with TCP. The display text is placed into UDP packets in a logical fashion (e.g., sentence by sentence, or paragraph by paragraph) and transmitted using UDP. UDP is also used to transmit graphical images, video, and other electronic content besides text. Although some display text may be lost overall user perception of the electronic content remains high with such an embodiment.

It should be understood that the programs, processes, methods and system described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the Steps of the flow diagrams may be taken in sequences other than those described, and more or fewer elements may be used in the block diagrams.

The claims should not be read as limited to the described order or elements unless stated to that effect. Therefore, all embodiments that come within the scope and spirit of the following claims and equivalents thereto are claimed as the invention.

We claim:

1. A method for dynamically providing electronic content over a computer network, comprising the following steps:
   receiving a request for original electronic content on a second network device from a first network device via a first network;
   determining a network latency on the first network between the second network device and the first network device;
   determining dynamically an amount of original electronic content to send to the first network device based on the determined network latency; and
   sending the determined amount of electronic content type from the second network device to the first network device in response to the request for original electronic content.

2. A computer readable medium having stored therein instructions for causing a central processing unit to execute the method of claim 1.

3. The method of claim 1 wherein the first network is any of the Internet or an intranet.

4. The method of claim 1 wherein the Step of determining a network latency includes sending one or more data packets of a first type with a timestamp from the second network device to the first network device, wherein the one or more data packets with the first type are returned to the second network device from the first network device.

5. The method of claim 4 wherein the one or more data packets of a first type are Internet Control Message Protocol data packets.

6. The method of claim 1 wherein the Step of determining an amount of original electronic content includes determining a number of graphical images in the original electronic content.

7. The method of claim 1 wherein the Step of determining an amount of original electronic content includes determining an amount of textual electronic content and an amount of non-textual electronic content in the original electronic content.

8. The method of claim 1 wherein the Step of sending the determined amount of electronic content type includes sending less than all of the requested original electronic content.

9. The method of claim 1 wherein the Step of sending the determined amount of electronic content type includes sending all of the requested original electronic content.

10. The method of claim 1 wherein the Step of determining an amount of original electronic content includes using a set of pre-determined cutoff latencies with the determined network latency.

11. The method of claim 1 wherein the Step of sending the determined amount of electronic content type includes sending the determined amount of electronic content progressively by sending selected components of the determined amount of electronic content.

12. The method of claim 1 wherein the Step of sending the determined amount of electronic content type includes sending the determined amount of electronic content using a compression scheme.

13. The method of claim 12, wherein the compression scheme is Joint Pictures Expert Group expression.

14. A method for providing electronic content over a computer network with adaptive transport, comprising the following steps:
   receiving a request for original electronic content on a second network device from a first network device via a first network, wherein the original electronic content includes at least a first content type and a second content type;
   determining a network latency on the first network between the second network device and the first network device;
   determining dynamically an amount of the second content type from the original electronic content to send to the first network device based on the determined network latency on the first network between the first network device and the second network device; and sending the first content type of electronic content from the original electronic content with a first protocol from the second network device to the first network device; and sending the determined amount of the second content type of electronic content from the original electronic content with a second protocol from the second network device to the first network device.

15. A computer readable medium having stored therein instructions for causing a central processing unit to execute the method of claim 14.

16. The method of claim 14 wherein the first content type from the original electronic content is any of text or hypertext.

17. The method of claim 14 wherein the second content type of electronic content from the original electronic content is any of graphical images, animation, audio or video electronic content.

18. The method of claim 14 wherein the first protocol is Transmission Control Protocol and the second protocol is User Datagram Protocol.

19. The method of claim 14 wherein the Step of sending the determined amount of the second content type of electronic content from the original electronic content with a second protocol includes sending the determined amount of second content type of the original electronic content progressively by sending selected components of the determined amount of the second content type.

20. The method of claim 14 wherein the Step of sending the determined amount of the second content type of electronic content from the original electronic content with a second protocol includes sending the determined amount of second content type of the original electronic content using a compression scheme.

21. A method for dynamically providing electronic content over a computer network to improve user perception, comprising the following steps:

receiving a Hypertext Transfer Protocol request for original electronic content on web server from a network browser on a user computer via a first network, wherein the original electronic content includes at least a first content type and a second content type;

determining a network latency on the first network between the web server and the network browser on the user computer;

determining dynamically an amount of original electronic content of the second content type send to the network browser on the user computer based on the determined network latency on the first network between the web server and the network browser on the user computer;

sending the first content type of electronic content from the original electronic content with Transmission Control Protocol from web server to the user computer;

sending the determined amount of the second content type of electronic content from the original electronic content User Datagram Protocol from web server to the network browser on the user computer; and presenting the first content type to a user via the network browser on the user computer; and presenting the second content type to the user via the network browser on the user computer.

22. A computer readable medium having stored therein instructions for causing a central processing unit to execute the method of claim 21.

23. The method of claim 21 wherein the first network is any of the Internet or an intranet.

24. The method of claim 21 wherein the first content type is text and the second content type is any of graphical images or video.

* * * * *